United States Patent
Malik et al.

(10) Patent No.: US 8,306,345 B2
(45) Date of Patent: *Nov. 6, 2012

(54) 3+N LAYER MIXED RASTER CONTENT (MRC) IMAGES AND PROCESSING THEREOF

(75) Inventors: Amal Malik, Pittsford, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/564,520

(22) Filed: Sep. 22, 2009

(65) Prior Publication Data

US 2011/0069885 A1 Mar. 24, 2011

(51) Int. Cl.
G06K 9/46 (2006.01)
G06K 9/34 (2006.01)

(52) U.S. Cl. ......... 382/240; 382/176; 382/232; 382/233

(58) Field of Classification Search .................. 382/232, 382/233, 240, 176
See application file for complete search history.

(56) References Cited

U.S. PATENT DOCUMENTS

| | | | |
|---|---|---|---|
| 6,633,670 B1 * | 10/2003 | Matthews ..................... | 382/176 |
| 7,236,641 B2 | 6/2007 | Curry et al. | |
| 7,242,802 B2 * | 7/2007 | Curry et al. .................. | 382/173 |
| 7,343,046 B2 | 3/2008 | Curry et al. | |
| 7,376,272 B2 | 5/2008 | Fan et al. | |
| 7,403,661 B2 | 7/2008 | Curry et al. | |
| 2004/0096102 A1 * | 5/2004 | Handley ........................ | 382/164 |
| 2005/0162702 A1 * | 7/2005 | Lee et al. ....................... | 358/2.1 |
| 2006/0104512 A1 * | 5/2006 | Hayashi et al. ............... | 382/176 |
| 2006/0269151 A1 * | 11/2006 | Sakuyama ..................... | 382/232 |
| 2007/0025622 A1 * | 2/2007 | Simard et al. ................. | 382/232 |
| 2007/0064275 A1 * | 3/2007 | Ohk .......................... | 358/426.01 |
| 2007/0253620 A1 | 11/2007 | Nagarajan et al. | |
| 2008/0292130 A1 * | 11/2008 | Nafarieh et al. .............. | 382/100 |
| 2009/0190830 A1 * | 7/2009 | Hasegawa ..................... | 382/165 |
| 2009/0263031 A1 * | 10/2009 | Usui et al. ..................... | 382/232 |
| 2009/0323089 A1 * | 12/2009 | Hayasaki ....................... | 358/1.9 |
| 2011/0026814 A1 * | 2/2011 | Nuuja et al. .................. | 382/164 |

OTHER PUBLICATIONS

U.S. Appl. No. 12/329,078, filed Dec. 5, 2008, Amal Malik.
U.S. Appl. No. 12/328,973, filed Dec. 5, 2008, Amal Malik.
Gonzalez, et al., Digital Image Processing, reprinted in 1993, pp. 518-564, Addison-Wesley Publishing.

* cited by examiner

*Primary Examiner* — Anand Bhatnagar
*Assistant Examiner* — Soo Park
(74) *Attorney, Agent, or Firm* — Pillsbury Winthrop Shaw Pittman, LLP

(57) ABSTRACT

A method for processing image data includes using advantages of both a three-layer MRC model and an N-layer MRC model to create a new 3+N layer MRC model and to generate a 3+N layer MRC image. The method includes providing input image data; segmenting the input image data to generate: (i) a background layer representing the background and the pictorial attributes of the image data, (ii) one or more binary foreground layers, (iii) a selector layer, and (iv) a contone foreground layer representing the foreground attributes of the image data on the background layer; and integrating the background layer, the selector layer, the contone foreground layer, and the one or more binary foreground layers into a data structure having machine-readable information for storage in a memory device. Each binary foreground layer includes one or more pixel clusters representing text pixels of a particular color in the input image data.

6 Claims, 13 Drawing Sheets west

3+N LAYER MIXED RASTER CONTENT (MRC) IMAGES AND PROCESSING THEREOF

BACKGROUND

1. Field

The present disclosure generally relates to mixed raster content (MRC) images, and in particular, combining a three-layer MRC model with an N-layer MRC model.

2. Description of Related Art

Scanning and exporting color images to a network has started to become one of the standard features offered by digital multifunction devices. File size of a color image is an important factor while exporting color images. In addition to offering different resolutions, different compression schemes are being offered to reduce the file size of the color image that needs to be exported. One of the popular compression/file formats that are currently being offered is Mixed or Multiple Raster Content (MRC) representation. The MRC representation provides as a way to achieve high image quality with small file size.

The MRC representation of documents is versatile. It provides the ability to represent color images and either color or monochrome text. The MRC representation enables the use of multiple "planes" for the purpose of representing the content of documents. The MRC representation is becoming increasingly important in the marketplace. It has been already established as the main color-fax standard. It is also offered as a selection in the Scan-to-Export feature, for example, in digital multifunction devices.

An image may generally include different types of text features, for example, text features on white background areas, text features on light colored (e.g., yellow colored) background areas (e.g., newspaper), light colored text features on dark colored background areas (e.g., white colored text on black background area), and text features on colored background areas (e.g., text-on-tint).

FIG. 1 shows one exemplary embodiment of a three-layer mixed raster content image data. As shown in FIG. 1, a document image 100 to be rendered using the mixed raster content format is generated using a background layer 110, a selector layer 120, and a foreground layer 130. The foreground layer 130 and the background layer 110 are both multi-level, and the mask or selector layer 120 is bi-level. A fourth, non-image data layer (not shown) may also be included in the mixed raster content image data file. The fourth layer often contains rendering hints which can be used by a rendering engine, such as Adobe® Acrobat®, to provide additional information on how particular pixels are to be rendered.

As shown in FIG. 1, the selector layer 120 is used to mask undifferentiated regions of color image data stored on the foreground layer 130 onto the background layer 110 to form the rendered image 100. In particular, the selector layer 120 contains high spatial frequency information for regions otherwise having slowly changing color information. In effect, regions whose color changes relatively slowly, if at all, are placed onto the foreground layer 130. In some MRC models, the foreground layer may also include color information regarding the pictorial regions. The shapes of those regions are then embedded into the selector layer 120. In contrast, regions having high color frequency, e.g., colors whose values change more significantly over very small spatial extents, are stored as continuous tone image data on the background layer 110. When the image represented by the data structure 100 is to be rendered or otherwise generated, the color information stored in the foreground layer 130 has spatial or shape attributes applied to it based on the binary information stored in the selector layer 120 and the resulting shaped color information is combined onto the background layer 110 to form the reconstructed layer 100.

In general, in the three-layer MRC model, the final image is obtained by using the mask or selector layer 120 to select pixels from the other two layers (i.e., the foreground layer 130 and the background layer 110). When the mask layer pixel value is 1, the corresponding pixel from the foreground layer 130 is selected, and when the mask layer pixel value is 0, the corresponding pixel from the background layer 110 is selected.

Generally, the shape of text is defined in the selector plane 120 and the color information of the text is contained in the foreground layer 130. In some of the three-layer MRC models, pictorial information is shared between the foreground layer 130 and the background layer 110 with color information of the pictorial areas being in the foreground layer 130. Most of these three-layer MRC models have an overlap between the foreground layer 130 and the background layer 110 for pictorial areas. These algorithms are less complicated than the ones in which background layer 110 holds the entire pictorial and background information, while the foreground layer 130 holds the text color information. Text in the three-layer MRC model is often jpeg compressed and hence offers poor image quality due to color fringing caused by jpeg compression. Black text is also not always pure black in the three-layer MRC model, since the foreground layer 130 takes colors from the original image.

An N-layer MRC model is also known, in which the foreground layer is separated into various independent sublayers based on color and spatial proximity of the pixels. Each of the foreground sublayers is generally binarized having a specific color. In the N-layer MRC model, more than one foreground sublayer may have the same color (e.g., mask 202 and mask 203 in FIG. 2 include red colored data). With reference to FIG. 2, an exploded view 210 of an N-layer MRC document 212 is illustrated, which comprises a number of layers, each of which in turn has a respective portion of the information to be graphically displayed in the document 212. The exploded view 210 shows seven mask layers 214, individually labeled as masks 201-207, each of which is overlaid on a background layer 216 and any preceding mask layers.

For example, the background layer 216 may comprise background image information (e.g., images, shading, etc.), and may be a contone jpeg image. Mask 201 may comprise data (e.g., binary G4 data, or some other suitable data type) printed or otherwise presented in black. Mask 202 may comprise red-colored data, Mask 203 may comprise another red-colored data, Mask 204 may comprise pink-colored data, Mask 205 may comprise yellow-colored data, and Mask 206 may comprise brown-colored data. In this manner, colored masks are overlaid on each other to generate the MRC image of the document. Mask 207 may comprise status information related to the scanner and/or document. Status information may comprise, without being limited to, a scanner signature, scanner ID information, scan-to-file authentication information, metadata related to objects in the document image, etc. Object metadata may include, without being limited to, location, size, date, type, etc., of the objects in the document. For instance, object type may be contone, halftone, low-frequency, high-frequency, smooth, rough, graphics, color, neutral, or the like. The status information may be printed or otherwise imaged in the same color as the background color of the background layer 216, so that it is not visible to the human eye and does not cause undesirable artifacts when scanned. It will be appreciated that the MRC document is not limited to a background layer and seven mask layers, but rather that any suitable number of layers may be employed in conjunction with the various features presented herein.

It is contemplated that the N-layer MRC model discussed above is not limited to color planes shown in FIG. 2, for example, red color plane, pink color plane, brown color plane, black color plane, and yellow color plane, but may also include a plane or a mask layer that may record any color.

As noted above, in the three-layer MRC model, the color of text is extracted in the foreground layer and is compressed using standard contone compression schemes (such as JPEG). The algorithms used in the three-layer MRC model to extract the color of text are relatively simple but compression of the foreground plane using any contone compression scheme may lead to image quality defects (i.e., non-uniformity and other artifacts) in text areas. For example, when the image quality is at a low value, the quality of text may deteriorate at the expense of improved file size.

In the N-layer MRC model, the text region is extracted from the original image. In most cases, the N-layer MRC models fail to extract text-on-tint information and as a result the pictorial region and in most cases text-on-tint information are placed in the background layer and are compressed using standard contone compression schemes (such as JPEG). The color of text is recorded separately in the binary layers and is compressed using any of the binary compression schemes (such as G4). Sometimes, these binary compression schemes (such as G4) may not include any loss associated with them The N-layer model, however, generally involves more complex algorithms having a lot of computations to separate image and text, and does not handle text-on-tint information well.

Generally, the N-layer MRC models (i.e., including the binary foreground layers) do not extract all of the text features from an image. For example, while some of the currently existing N-layer MRC models are configured to extract only the text features on white background areas, other N-layer MRC models are configured to extract text features from both white background areas and the light colored (e.g., yellow colored) background areas (e.g., newspaper). These N-layer MRC models generally fail to extract text on the darker background areas as well as text on the shadow areas of the image. In other words, as noted above, the N-layer MRC models do not handle text-on-tint information well. Moreover, some of these N-layer MRC models also fail to extract large colored text even in white background areas.

The proposed method retains the inherent advantage of the three-layer MRC model in text-on-tint areas, and that of N-layer MRC model in text-in-white area or text-in-background area. Thus, the proposed method produces better quality output than the original three-layer MRC model and the original N-layer MRC model, for example, in text areas.

SUMMARY

According to one aspect of the present disclosure, a method for processing image data is provided, the method includes providing input image data; segmenting the input image data to generate: (i) a background layer representing the background attributes of an image, and (ii) one or more binary foreground layers, wherein each binary foreground layer comprises one or more pixel clusters representing text pixels of a particular color in the input image data; further segmenting an image data on the background layer to generate: (i) a sub-background layer representing the background attributes of the image data on the background layer; (ii) a selector layer for identifying one or more foreground attributes of the image data on the background layer that are not included in the sub-background layer; and (iii) a sub-foreground layer representing the foreground attributes of the image data on the background layer; and integrating the sub-background layer, the selector layer, the sub-foreground layer, and the one or more binary foreground layers into a data structure having machine-readable information for storage in a memory device.

According to another aspect of the present disclosure, a method for processing image data is provided, the method includes providing input image data; extracting at least text and line art features from the input image data into a text image data; subtracting the text image data from the input image data to obtain a first background layer, the first background layer comprising text and line art features not extracted into the text image data and pictorial features of the input image data; processing the text image data to generate one or more first binary foreground layers, wherein each first binary foreground layer comprises one or more pixel clusters representing text and line art pixels of a particular color in the text image data; segmenting the first background layer to generate a second background layer representing the background attributes of the first background layer; a second contone foreground layer representing the foreground attributes of the first background layer; and a selector layer for identifying one or more foreground attributes of the second contone foreground layer not included in the second background layer; and integrating the second background layer, the selector layer, the second contone foreground layer, and the one or more first binary foreground layers into a data structure having machine-readable information for storage in a memory device.

According to another aspect of the present disclosure, a method for processing image data is provided, the method includes providing input image data; segmenting the input image data to generate: (i) a background layer representing the background attributes of an image; (ii) a selector layer for identifying one or more foreground attributes of the image not included in the background layer; and (iii) a foreground layer representing the foreground attributes of the image; analyzing the selector layer and the foreground layer on a pixel-by-pixel basis to extract one or more binary sub-foreground layers, wherein each binary sub-foreground layer comprises a pixel data representing text pixels of a particular color in the input image data; and integrating the background layer, the selector layer, the foreground layer, and the one or more binary sub-foreground layers into a data structure having machine-readable information for storage in a memory device.

According to another aspect of the present disclosure, a data structure having machine-readable information for storage in a memory device that when implemented by a processor renders an image is provided. The data structure includes a background layer representing the background attributes of an image; a selector layer for identifying one or more foreground attributes of the image not included in the background layer; a foreground layer representing the foreground attributes of the image; and one or more binary foreground layers, wherein each binary foreground layer comprises one or more pixel clusters representing text pixels of a particular color in the image.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
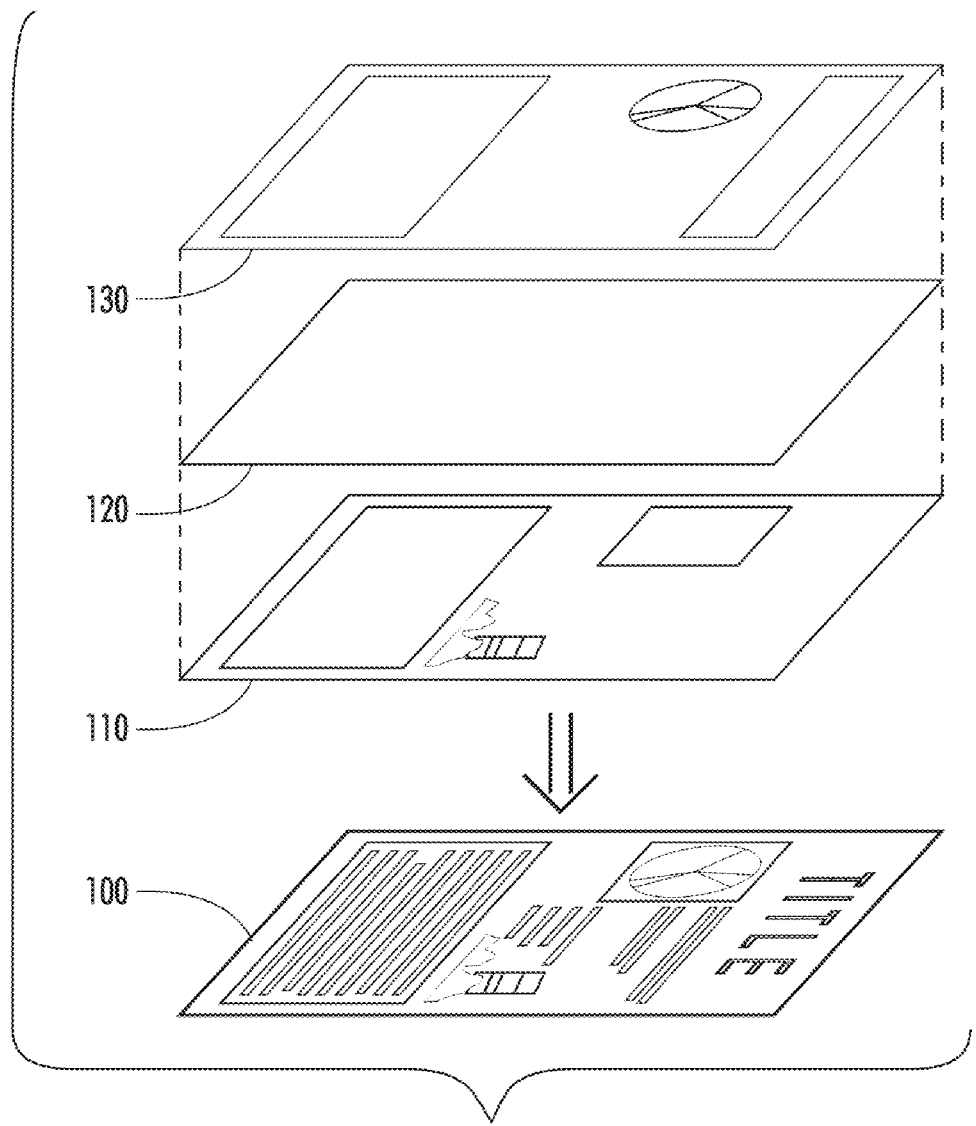
FIG. 1 shows a conventional three-layer mixed or multiple raster content (MRC) data structure.
Figure 2:
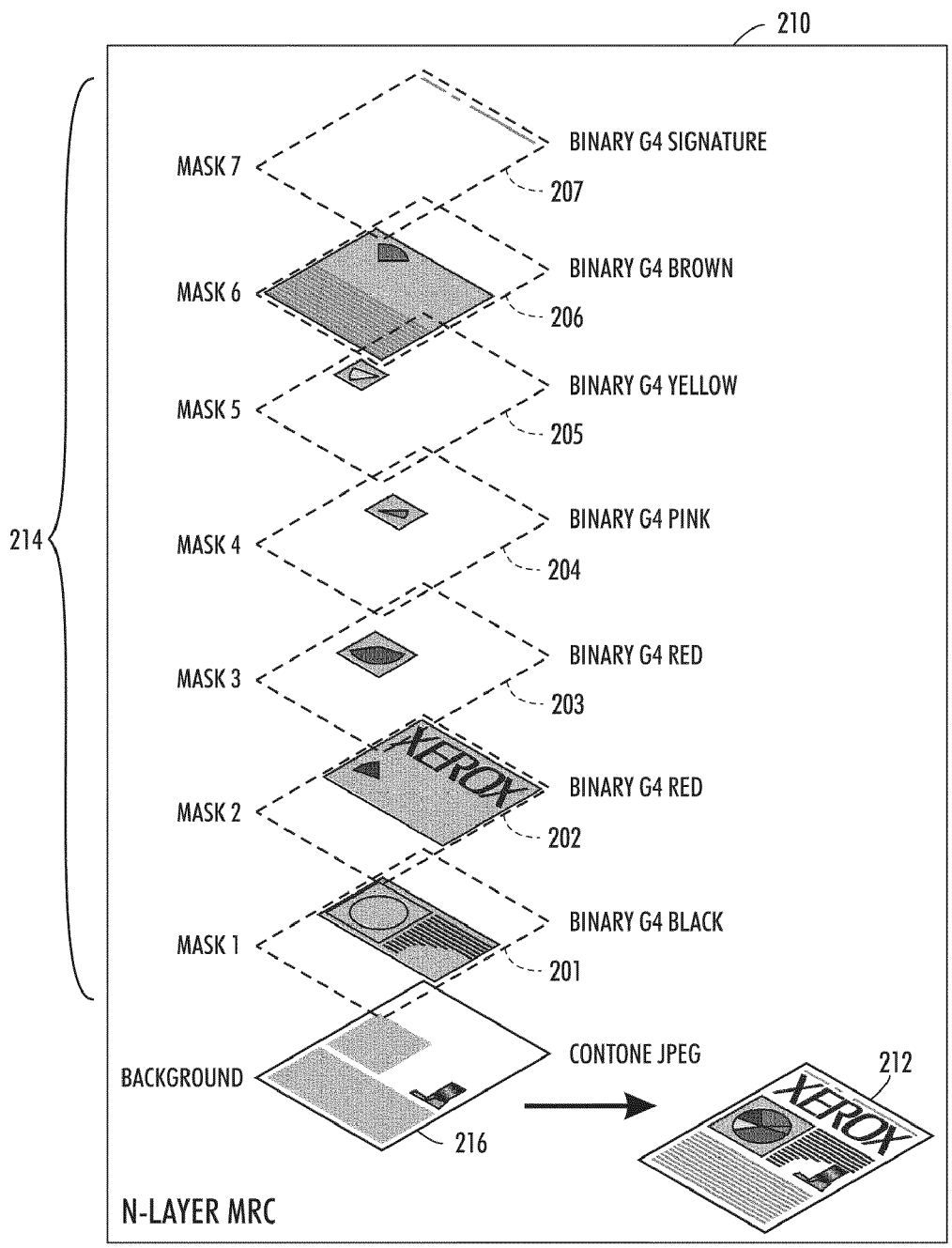
FIG. 2 shows a conventional N-layer mixed or multiple raster content (MRC) data structure.

The present disclosure proposes a method to combine a three-layer MRC model with an N-layer MRC model. In an embodiment, the method applies the three-layer MRC model to the pictorial region and the N-layer model to the text region. The pictorial-text separation is done using existing techniques such as auto-windowing. The pictorial region (may also include the text-on-tint information) is processed using the three-layer MRC model. The pictorial-text separation is also done using other existing techniques such as by analyzing the foreground and selector planes extracted from the three-layer MRC model (as will be clear from the discussions with respect to FIGS. 5 and 8). The text region, after extraction, is subdivided into N binary text layers based on the color of the text. These N binary text layers are then integrated with the three layers of the three-layer MRC model to create a 3+N layer MRC data structure. The method, thus, identifies regions of text either before or after the three-layer MRC model. In some embodiments, the foreground and selector layer may then be cleaned of the text areas that are extracted into the N layers.

In pictorial areas, the method retains the inherent advantage (e.g., sharper edge and text-on-tint) of the three-layer MRC model over other alternatives such as the N-layer MRC model. In other text areas (i.e., text-on-white area or text-on-background area), the method produces better quality outputs than the original three-layer MRC model. The method provides image quality improvements in certain text-on-tint situations. Thus, the present disclosure proposes a method to generate a 3+N layer MRC model with an emphasis on text quality optimization.

Generally, the text layer includes pixel data corresponding to text in an image that may be assigned a predetermined value for a particular color. The addition of the text layer not only improves text quality, but may also provide opportunities for file size reduction (i.e., data compression).

Computers and other electronic equipment typically render color in three-dimensional (3-D) coordinates such as RGB. Many image printing systems, on the other hand, print in either three-dimensional colorant space, cyan, magenta, yellow (CMY) or four-dimensional colorant space, cyan, magenta, yellow, and black (CMYK) which can be derived from the input values, e.g., RGB.

A device independent color space may be used as an intermediate representation of the input image. A device independent space, such as a luminance-chrominance space, denoted generically as $LC_1C_2$ may be used. The L component represents luminance or lightness, and $C_1$ and $C_2$ are the two chrominance coordinates representing red-green and yellow-blue variations, respectively. Examples of a luminance-chrominance space representations are L*a*b*, or YCbCr, etc. Typically, each of the luminance, and chrominance space representations are 8-bit pixel data (i.e., values ranging from 0-255). Although, it will be appreciated that higher and lower bit level data may similarly be used.

Translations may be used to derive $LC_1C_2$ from input RGB, and from $LC_1C_2$ to image printing system colorant space. In other words, if the image is in an RGB space, it is typically first converted to such a luminance-chrominance representation for simplicity of edge calculation. The particular luminance-chrominance representation used is not limiting, and any representation may be used.

In some embodiments, the background layer and foreground layer may be multi-level (grayscale), while the selector layer and text layer may be bi-level (i.e., binary). For example, the background layer and foreground layer may be used for storing continuous-tone (i.e., contone) information, such as the background layer representing background attributes of an image, like pictures and/or smoothly varying background colors. The foreground layer would represent the color information of the text and line art, and in some MRC models, the color information of the pictorial content of the image. The selector layer may be defined as a binary (1-bit deep) layer. The N text layers may be binary data. The optional rendering hints layer may use contone data.

Figure 3:
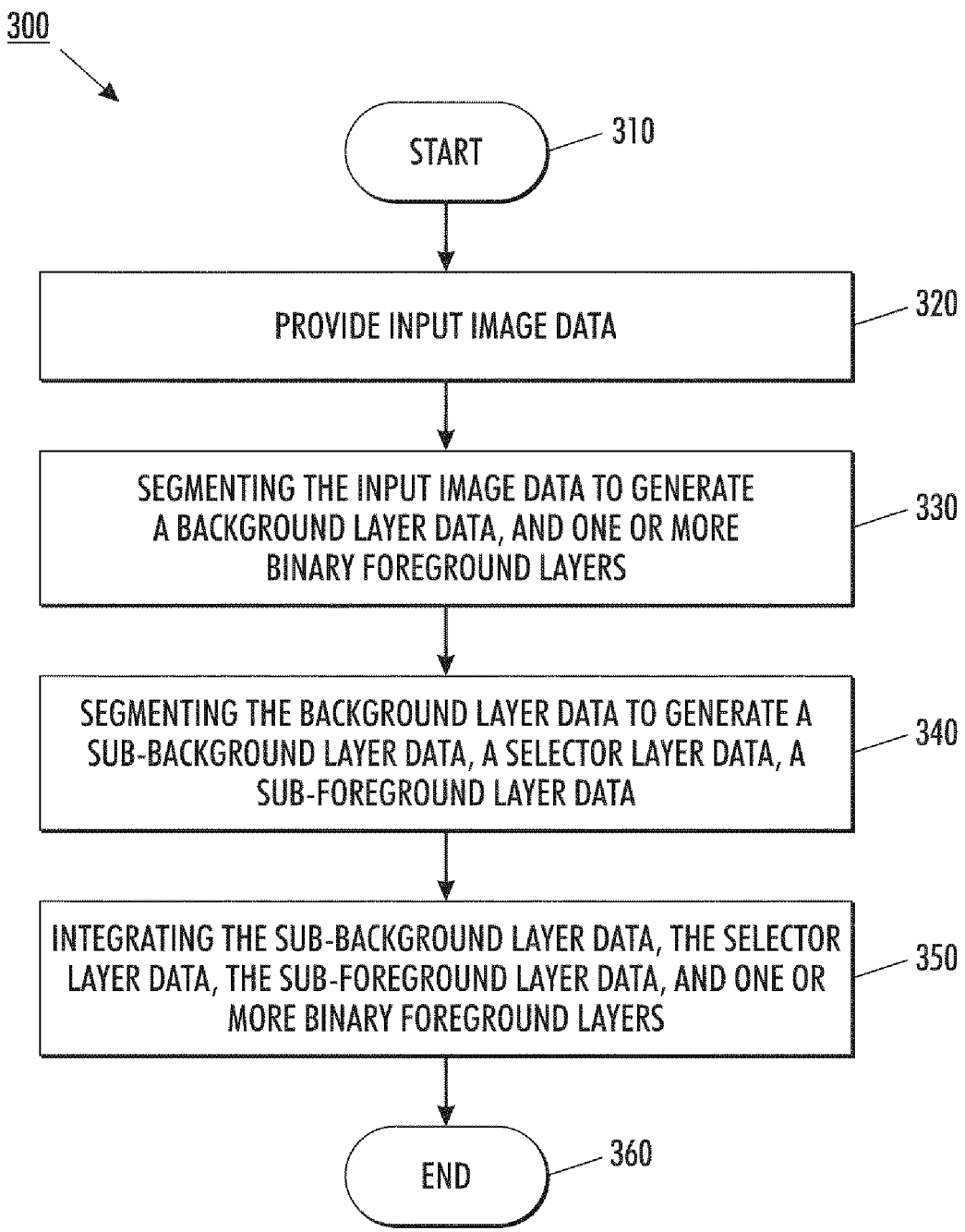
FIG. 3 shows a method for processing image data, wherein an N-layer MRC model is first applied to an input image data and then a three-layer MRC model is applied to the background layer obtained from the N-layer MRC model according to an embodiment of the present disclosure.

FIG. 3 shows a method 300 for generating a 3+N layer MRC data structure, according to an embodiment of the present disclosure. The method 300 is configured for processing image data, wherein an N-layer MRC model is first applied to an input image data and then a three-layer MRC model is applied to a background layer obtained from the N-layer MRC model. In other words, in the method 300, an N-layer MRC model is first applied to input image data to generate a background layer and one or more binary foreground layers. A three-layer MRC model is then applied to the background layer (i.e., obtained from the N-layer MRC model) to generate a selector layer, a sub-background layer, and a sub-foreground layer. The selector layer, the sub-background layer, and the sub-foreground layer obtained from the three-layer MRC model are integrated with the one or more binary foreground layers obtained from the N-layer MRC model to generate a 3+N layer MRC data structure.

The method begins at procedure 310. At procedure 320, input image data may be provided. For example, the input image data may include a digital file or an electronic image of a scanned document.

Next at procedure 330, a first image data segmenting unit may be configured to generate a background layer, and one or more binary foreground layers. The background layer may be used for representing the background attributes of an image. For example, the background layer may hold color information corresponding to halftone images. Each binary foreground layer includes one or more pixel clusters representing text pixels of a particular color in the image input data.

The generation of one or more binary foreground layers is based on the color of the pixels and the spatial proximity of the different pixels having the same color. In other words, the text areas having the same color are clustered together and each cluster is assigned an average value which is assigned to all the pixels in that cluster. For example, more than one cluster may have the same color. Each color cluster may have different sizes based on the spatial coordinates of pixels belonging to that particular cluster. The pixels are assigned to clusters based on their neighboring pixel and color information.

Next at procedure 340, a second image data segmenting unit may be configured to receive the background layer (i.e., obtained from the first image data segmenting unit) and to generate three separate output layers (or planes). The three separate output layers obtained from the second image data segmenting unit may include: the sub-background layer, the selector layer, and the sub-foreground layer. An exemplary image segmentor is described in U.S. Pat. No. 7,242,802, herein incorporated by reference in its entirety.

The sub-background layer data may be used for representing the background attributes of the image data of the background layer (i.e., obtained from the N-layer MRC model). For example, the sub-background layer data may hold color information corresponding to the image data of the background layer data (i.e., obtained from the N-layer MRC model). The selector layer may be used for identifying one or more foreground attributes of the image not included in the sub-background layer. For example, the selector layer may hold text as well as edge information (e.g., line art drawings). The sub-foreground layer may be used for representing the foreground attributes of the image data of the background layer (i.e., obtained from the N-layer MRC model). For example, the sub-foreground layer may hold the color information corresponding to the corresponding text and/or line art found in the selector layer. In an embodiment, the sub-foreground layer may also include the color information regarding the pictorial content of the image data of the background layer (i.e., obtained from the N-layer MRC model).

Next at procedure 350, a 3+N MRC integrating unit is configured to integrate the sub-background layer, the selector layer, the sub-foreground layer output by the second image segmenting unit, and one or more binary foreground layers output by the first image segmenting unit into a data structure having a machine-readable information for storage in a memory device. In an embodiment, the data structure may include data elements as well as information on how the image data should be interpreted.

In an embodiment, the JPEG 2000 image coding system (ISO/IEC 15444-6:2003) may be adapted for such purpose. JPEG 2000 provides for various layers of an object and permits each layer's attributes to be defined. For example, according to one embodiment of the disclosure, the background layer may be defined as layer0, the selector layer defined as layer1, and the foreground layer defined as layer2. The background layer and the foreground layer may be contone data while the selector layer may be binary. In addition, the binary foreground layers or the text layers may be added as a layer3 through layerN, which may be binary.

The text layers may be associated with a color tag or color mask for a predetermined value corresponding to the particular color. Table 1 shows one embodiment for the data structure for the 3+N layer MRC data structure. Exemplary pixel data for each layer is shown in parenthesis.

TABLE 1 layer0: background layer (contone)
layer1: selector layer (binary)
layer2: foreground layer (contone)
layer3: binary foreground layer (i.e., text layer) 1 (binary)
layer4: binary foreground layer (i.e., text layer) 2 (binary)
.
.
.
layer 3 + N: binary foreground layer (i.e., text layer) N (binary)

In an embodiment, contone compression models, such as, for example, JPEG or ISO/IEC 10918-1:1994, may similarly be adapted.

Pixels in each layer have a corresponding pixel in each of the other layers (and the input image data) which generally "match up" in location and/or position within the image. An active (ON) pixel indicates that the pixel is to be used in rendering the image. For binary data, an active pixel value may be 1. For contone image data, an active value may be some actual color value. By contrast, an inactive (OFF) pixel indicates that the pixel is not being used. For binary data, an inactive pixel value may be 0. For contone image data, an inactive pixel value may be a null or empty value.

According to an embodiment, the 3+N layer MRC data structure may be used with a digital computer or machine, such as a printer. For example, the data structure may be a digital file that includes computer- or machine-readable information to be executed by a processor to render or provide an image corresponding to the data file. The data file may be stored or otherwise provided on a computer- or machine-readable storage media device (i.e., flash memory, DVD/CD ROM, floppy disk, removable or permanent hard drive, etc.).

Various software applications support viewing JPEG 2000 images. For example, Adobe® Acrobat® 7.0 may be used to view the 3+N layer MRC data structure having the text layer.

In an embodiment, the method 300 may also include a procedure (not shown) for enhancing the resolution of the text layers to further improve image quality. In addition, noise reduction algorithms may also be applied.

In an embodiment, the method 300 may also include a procedure (not shown) configured to compress one or more of the various layers of the 3+N layer MRC data structure. For example, different compression schemes may be used that optimally reduce the file size of a particular layer. In one implementation, a binary compression algorithm may be used for the text layers. The method ends at procedure 360.

Figure 4:
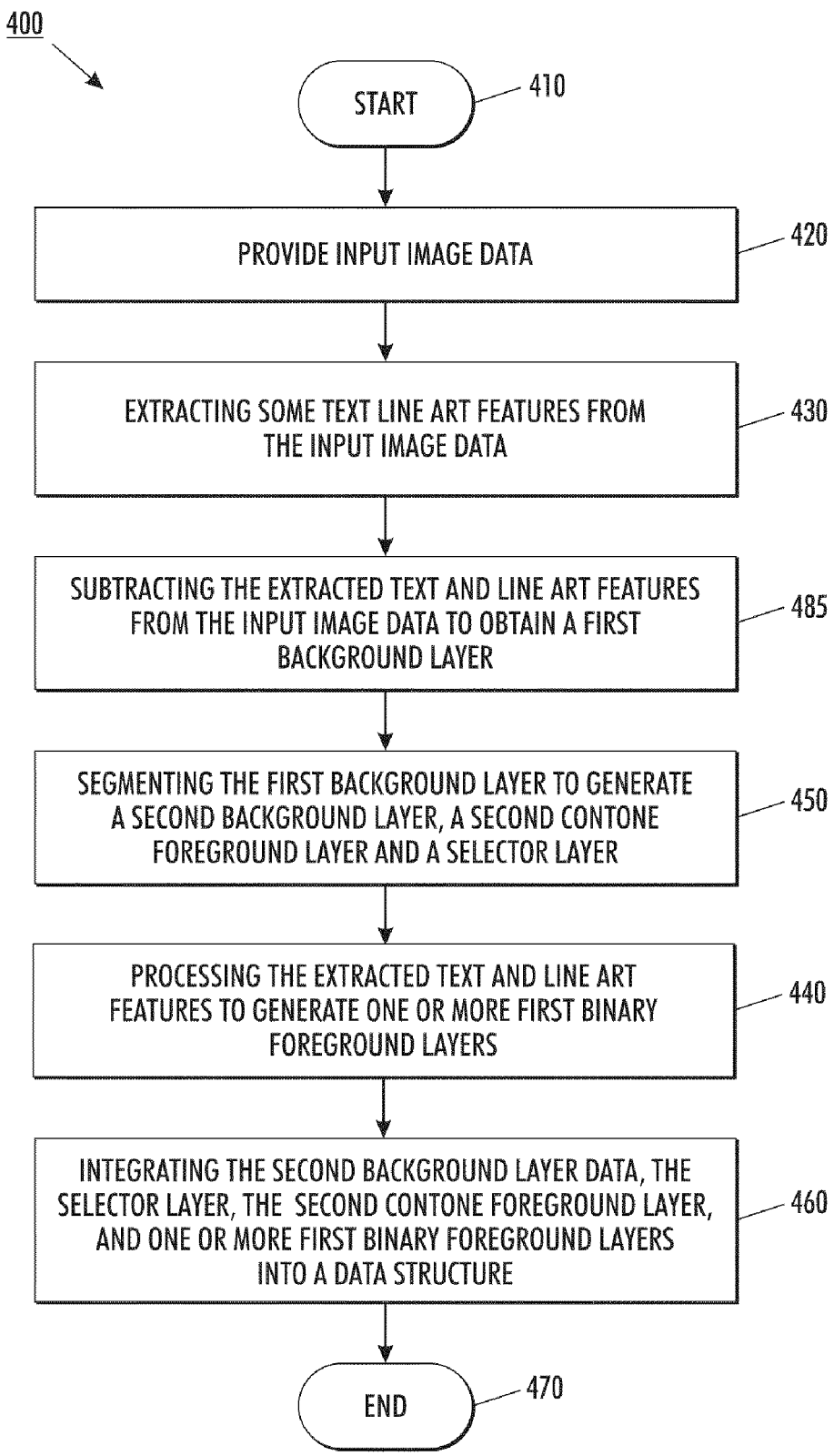
FIG. 4 shows a method for processing image data, wherein the input image data is first separated into pictorial and text regions, an N-layer MRC model is applied to text regions and a three-layer MRC model is applied to pictorial regions according to an embodiment of the present disclosure.

FIG. 4 shows an exemplary method 400 for generating a 3+N layer MRC data structure, according to an embodiment of the present disclosure. The method 400 is configured for processing image data, wherein text and line art features are separated from the input image data and are processed to generate one or more binary foreground layers. A first background layer (i.e., text and line art features that are not extracted from the input image data, and the pictorial features of the input image data) is obtained by subtracting the extracted text and line art features from the input image data. The first background layer is then segmented using a three-layer MRC model to obtain a second background layer, a selector layer, and a second contone foreground layer.

The method begins at procedure 410. At procedure 420, input image data may be provided. For example, the input image data may include a digital file or an electronic image of a scanned document.

Next at procedure 430, a text and line art extraction unit may be configured to extract some of the text and line art features from the input image data (i.e., obtained at procedure 420). Generally, line art features may include graphs, lines, arrows in an image. The text features may include text on white background areas, a text on highlight or light colored background areas. In an embodiment, this extraction is done by using, for example, auto-windowing operation, of any of a number of types known in the art or other morphological operations discussed below. This extraction may performed on a pixel-by-pixel basis.

In a morphological operation, the value of each pixel in the output image is based on a comparison of the corresponding pixel in the input image with its neighboring pixels defined by a window element (also known as a structural element). The window element may be an n×n array where n is any number greater than 2. Preferably, n may be greater than 7, for example, 9 to 11 for distinguishing text from non-text features.

Morphological operations generally include erosion and/or dilation steps. Various morphological operations, including erosion and dilation of a binary image, are disclosed, for example, in *Digital Image Processing* by Rafael C. Gonzalez and Richard E. Woods (Addison-Wesley Publishing), reprinted 1993, pp. 518-564, herein incorporated by reference in its entirety.

In erosion, a certain contiguous pictorial element A may be shrunk by decreasing its periphery by the area of a window element B. Erosion may be defined mathematically according to equation (1) as follows:

$$A \ominus B = \{x | (B)_x \subseteq A\} \quad (1)$$

In dilation, the opposite occurs, with the contiguous region A being enlarged by increasing its periphery by the area of a window element B. Dilation may be defined mathematically according to equation (2) as follows:

$$A \oplus B = \{x | (\hat{B})_x \cap A \neq \emptyset\} \quad (2)$$

Dilation and erosion steps may be combined to provide image processing. For example, opening and closing processes may be used for such purposes. An opening process may include an erosion followed by a dilation. Opening may be used to smooth the contours of an image and break narrow isthmuses and/or eliminate thin protrusions. A closing may include a dilation followed by an erosion. Closing also smoothes the images, but by fusing narrow breaks and long thin gulfs, eliminating small holes, and filling gaps in contours. Other morphological operation might also be used such as Hit-or-Miss transforms to identify particular shapes.

A plurality of morphological operations may be subsequently performed on the binary image to identify pictorial elements and non-text features. In one embodiment, a sequence of morphological operations may be applied, which includes: (i) erosion (9×9 window), (ii) dilation (9×9 window), (iii) erosion (11×11 window), and (iv) erosion (11×11 window). Of course, the sequence of morphological operations and/or windows may be tailored, so as to exclude various fonts, text sizes, and/or other features. Also, the windows used may be resolution dependent (i.e., the greater the resolution, the greater the sized window that is necessary to exclude text).

In one embodiment, at procedure 430, the text and line art features on the white or background areas are extracted using the text extraction unit. It will be appreciated that in other embodiments, other text-identifying and text-extracting algorithms may similarly be used. The method 400 then proceeds to procedure 440.

Next, at procedure 435, a subtraction unit may be configured to subtract the extracted text and line art features (i.e., obtained from procedure 430) from the input image data to obtain the first background layer. The first background layer includes text and line art features that are not extracted from the input image data, and the pictorial features of the input image data. The method 400 then proceeds to procedure 450.

At procedure 440, a first text processing unit may be configured to process the text image data, which includes some of the text and the line art features extracted from the input image data, to generate one or more first binary foreground layers. Each first binary foreground layer includes one or more pixel clusters representing text and line art pixels of a particular color in the text image data. In other words, the text image data may be separated into N layers based on the color and spatial proximity of the different text regions.

The generation of one or more binary foreground layers is based on the color of the pixels and the spatial proximity of the different pixels having the same color. In other words, the text and line art areas having the same color are clustered together and each cluster is assigned an average value which is assigned to all the pixels in that cluster. For example, more than one cluster may have the same color. Each color cluster may have different sizes based on the spatial coordinates of pixels belonging to that particular cluster. The pixels are assigned to clusters based on their neighboring pixel and color information. The method proceeds to procedure 460 from procedure 440.

At procedure 450, a first data segmenting unit may be configured to segment the first background layer to generate: a second background layer, a selector layer, and a second contone foreground layer. The first background layer includes text and line art features not extracted from the input image data, and pictorial features of the input image data. The second background layer represents the background attributes of the first background layer. The second contone foreground layer generally represents the foreground attributes of the first background layer. The selector layer is configured to identify one or more foreground attributes of the first background layer not included in the second background layer. The second contone foreground layer includes the text-on-tint information as well as the pictorial edge information or the pictorial color features of the background layer. The method 400 proceeds to procedure 460 from procedure 450.

In an embodiment, the method 400 may also include a procedure (not shown) for enhancing the resolution of the text layers to further improve image quality.

Next, at procedure 460, the 3+N layer MRC integrating unit may be configured to integrate the output of the first text processing unit and the output of the first data segmenting unit to produce a 3+N MRC layer data structure having a machine-readable information for storage in a memory device. In other words, the one or more first binary foreground layers output by the first text processing unit are integrated with the second background layer, the selector layer, and the second contone foreground layer output by the first data segmenting unit to produce a 3+N MRC layer data structure having a machine-readable information for storage in a memory device. In an embodiment, the JPEG 2000 image coding system (ISO/IEC 15444-6:2003) (i.e., described with respect to the method 300) may be adapted for such purpose. The method 400 ends at procedure 470.

Figure 5:
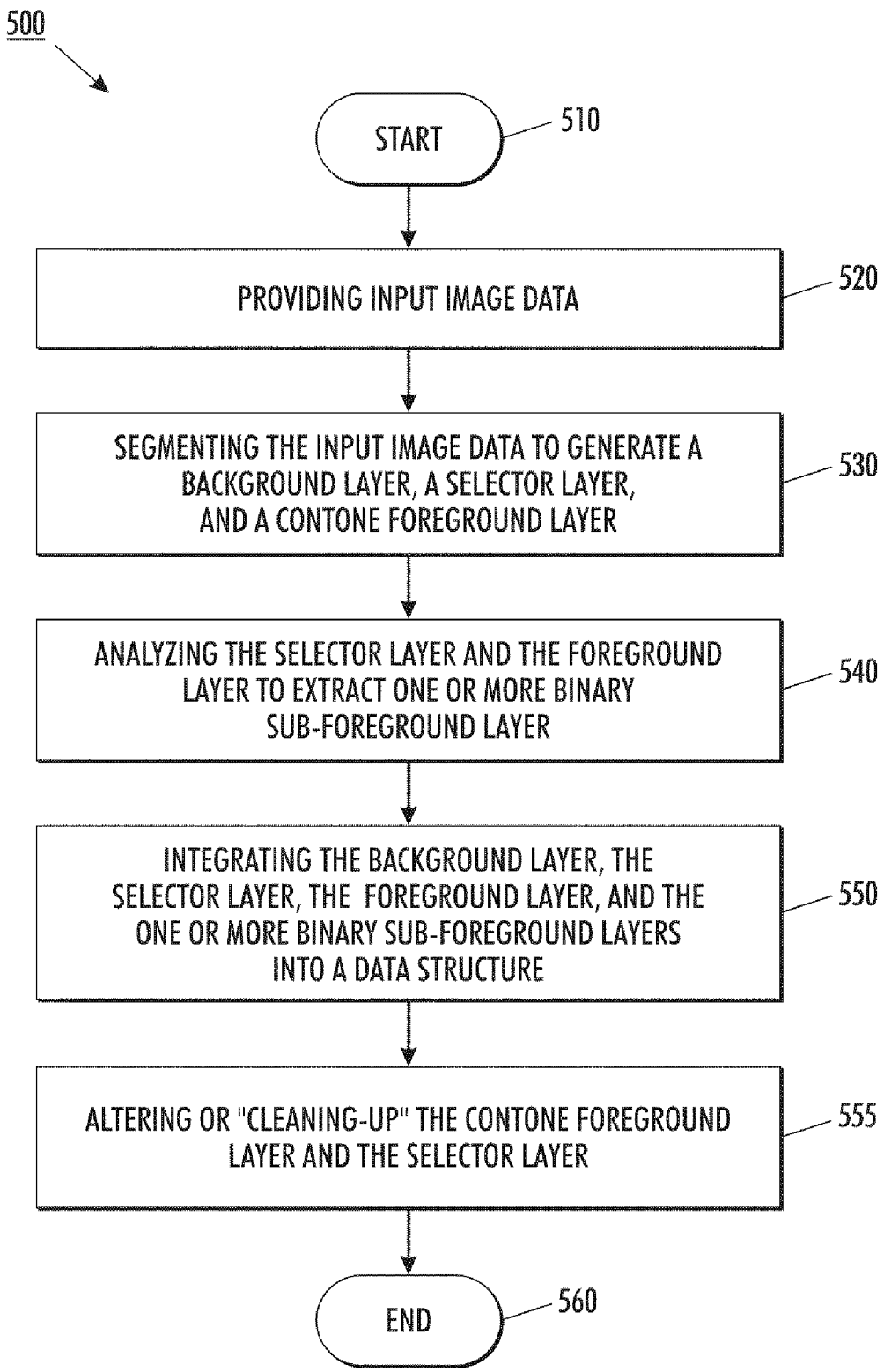
FIG. 5 shows a method for processing image data, wherein a three-layer MRC model is first applied to an input image data and then the selector layer and foreground layer information is used to extract N-layers according to an embodiment of the present disclosure.

FIG. 5 shows an exemplary method 500 for generating a 3+N layer MRC data structure, according to an embodiment of the present disclosure. The method 500 is configured for processing image data, wherein a three-layer MRC model is first applied to an input image data and then the selector layer and foreground layer information is used to extract N-layers.

The method begins at procedure 510. At procedure 520, input image data may be provided. For example, the input image data may include a digital file or an electronic image of a scanned document.

Next at procedure 530, an image data segmenting unit may be used to generate three separate output layers from the input image data. These layers may include: the background layer, the selector layer, and the contone foreground layer. An exemplary image segmentor is described in U.S. Pat. No. 7,242,802, herein incorporated by reference in its entirety.

The background layer may be used for representing the background attributes of an image. For example, the background layer may hold color information corresponding to halftone images. The selector layer may be used for identifying one or more foreground attributes of the image not included in the background layer. For example, the selector layer may hold text as well as edge information (e.g., line art drawings). The contone foreground layer may be used for representing the foreground attributes of the image. For example, the contone foreground layer may hold the color information corresponding to the corresponding text and/or line art found in the selector layer. In some implementations, the foreground layer may also include the color information regarding the pictorial content of the image.

Next at procedure 540, a text layer processing unit is configured to analyze the selector layer and the foreground layer, for example, on a pixel-by-pixel basis to extract one or more binary sub-foreground layers. Each binary sub-foreground layer comprises a pixel data that represents text pixels of a particular color in the input image data. This extraction is preferably performed on a pixel-by-pixel basis, wherever, the pixel (i.e., used in rendering the image) in the selector layer is ON or includes a value of 1, the pixel in the foreground layer includes a non-zero value, and the pixel in the background layer includes a value equal to zero or a background value. The background layer has all zero values (for luminance channel, chrominance channel A and chrominance channel B) in the non-pictorial areas of the image. That is, the background layer has all zero values for all three channels (i.e., luminance channel, chrominance channel A and chrominance channel B) of the pixel, wherein the pixel in the selector layer is ON and the pixel in the foreground layer includes a non-zero value (i.e., luminance channel, chrominance channel A and chrominance channel B do not all have non-zero values). In the three layer MRC model (i.e., described in U.S. Pat. No. 7,242,802, herein incorporated by reference in its entirety), after the selector, the foreground and the background layers are generated, the background and the foreground layers are configured to undergo a cleanup operation in order to further compress the background and the foreground layers. At this stage, the background plane pixels are set to have zero values for strong edge text regions. As noted above, the selector layer may be binary, in which an active (ON) pixel (i.e., the pixel used in rendering the image) value may be 1. The foreground layer and the background layer may be contone, in which an active (ON) pixel (i.e., the pixel used in rendering the image) may be some actual color value.

Text extraction from the selector and foreground layer information may also be performed using some text extraction algorithms by making the selector layer go through some morphological operations or using some auto windowing techniques on the foreground layers as explained above.

The extraction of one or more binary sub-foreground layers is based on the color of the pixels and the spatial proximity of the different pixels having same color. In other words, the text areas having the same color are clustered together and each cluster is assigned an average value which is assigned to all the pixels in that cluster. For example, more than one cluster may have the same color. Each color cluster may have different sizes based on the spatial coordinates of pixels belonging to that particular cluster. The pixels are assigned to clusters based on their neighboring pixel and color information. In an embodiment, the method 500 may also include a procedure (not shown) for enhancing the resolution of the text layers to further improve image quality.

The 3+N layer MRC integrating unit may be configured to integrate the output of the image data segmenting unit and the text layers generated by the text layer processing unit to produce a 3+N MRC layer data structure having a machine-readable information for storage in a memory device. In other words, the one or more binary sub-foreground layers output by the text layer processing unit are integrated with the background layer, the selector layer, and the foreground layer output by the image data segmenting unit to produce a 3+N MRC layer data structure having a machine-readable information for storage in a memory device.

In an embodiment, the JPEG 2000 image coding system (ISO/IEC 15444-6:2003) (i.e., described with respect to the method 300) may be adapted for such purpose.

In an embodiment, the method 500 may also include a procedure configured to alter or "clean-up" one or more layers of the 3+N MRC layer data structure based on the text layers. Such a procedure is described in detail in U.S. patent application Ser. No. 12/329,078, herein incorporated by reference in their entirety. For example, in an embodiment, the method 500 may include a procedure 555 configured to "clean-up" the original foreground layer and the selector layer. The method 500 ends at procedure 560.

In contrast to the methods 300 and 400, the method 500 includes a single segmentation procedure for generating a 3+N layer MRC data structure. However, it is contemplated that the method 500 may be extended to include more segmenting units (e.g., when other text extraction techniques are used in the method 500).

Figure 6:
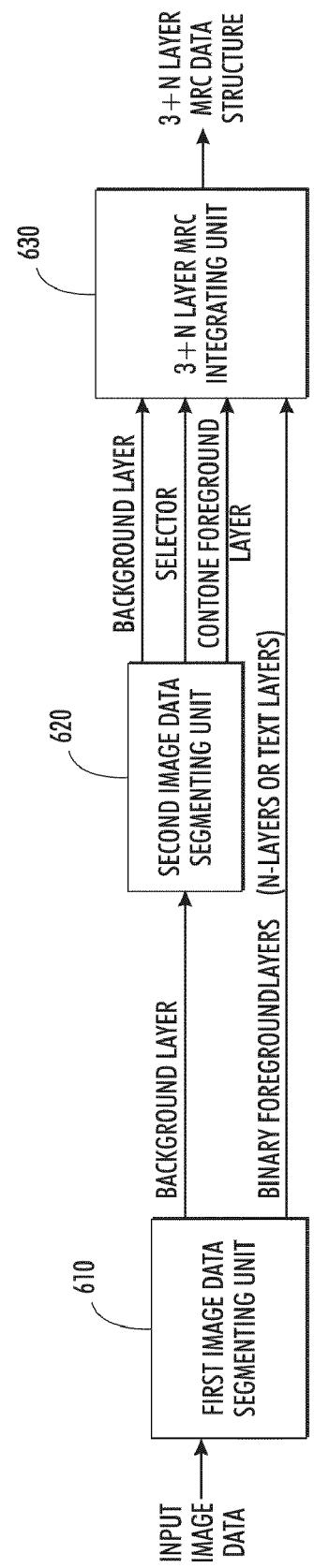
FIG. 6 shows a system for processing image data, wherein an N-layer MRC model is first applied to an input image data and then a three-layer MRC model is applied to the background layer obtained from the N-layer MRC model according to an embodiment of the present disclosure.

FIG. 6 shows a system for processing image data, wherein an N-layer MRC model is first applied to an input image data and then a three-layer MRC model is applied to the background layer obtained from the N-layer MRC model according to an embodiment of the present disclosure.

The system 600 for generating a 3+N layer MRC data structure generally includes a first image data segmenting unit 610, a second image data segmenting unit 620, a 3+N layer MRC integrating unit 630, and a clean-up processing unit 640. In an embodiment, the functionality of the various components of the system 600 may be combined, and/or additional components may be provided.

Input image data may be received by the system 600 through an interface. In one embodiment, the interface may be connected to a network, a memory device, or machine (e.g., a scanner) to receive input image data.

The first image data segmenting unit 610 may be configured to receive input image data and generate a background layer, and one or more binary foreground layers (i.e., N-layers). In an embodiment, the text may be separated into one or more binary foreground or N-layers based on the color and spatial proximity of the different text regions.

The generation of one or more binary foreground layers is based on the color of the pixels and the spatial proximity of the different pixels having same color. In other words, the text areas having the same color are clustered together and each cluster is assigned an average value which is assigned to all the pixels in that cluster. For example, more than one cluster may have the same color. Each color cluster may have different sizes based on the spatial coordinates of pixels belonging to that particular cluster. The pixels are assigned to clusters based on their neighboring pixel and color information.

The second image data segmenting unit 620 may be configured to receive background layer (i.e., output from the first image data segmenting unit 610) and to generate a sub-background layer, a selector layer, and a sub-foreground layer. As noted above, in one embodiment, the sub-background and sub-foreground layers may be contone image data, while the selector layer may be binary. Various image segmentors may be used, for example, as disclosed in U.S. Pat. No. 7,242,802, mentioned above.

Generally, images have text on them, such as "text-on-tint" images, where the tint is found as an image data. In the N-layer MRC model, the text-on-tint information is generally missing. In other words, the N-layer MRC model or the first image data segmenting unit 610 may not extract the text-on-tint information very well in some cases. The text-on-tint information is extracted in the three-layer MRC model in the sub-foreground layer.

The sub-foreground layer that is generated from the three-layer MRC model includes the text-on-tint information as well as the pictorial edge or color information. The sub-background layer that is generated from the three-layer MRC model includes only the pictorial information.

In an embodiment, the resolution of the text layers may be enhanced to further improve image quality by a resolution processing unit (not shown).

The 3+N layer MRC integrating unit 630 may be configured to integrate the output of the second image data segmenting unit 620 and the foreground data from the first image data segmenting unit 610 to produce a 3+N MRC layer data structure. That is, the sub-background layer, the selector layer, the sub-foreground layer output by the second image data segmenting unit 620 are integrated with the one or more binary foreground layers output by the first image data segmenting unit 610 to produce a data structure having a machine-readable information for storage in a memory device.

Figure 7:
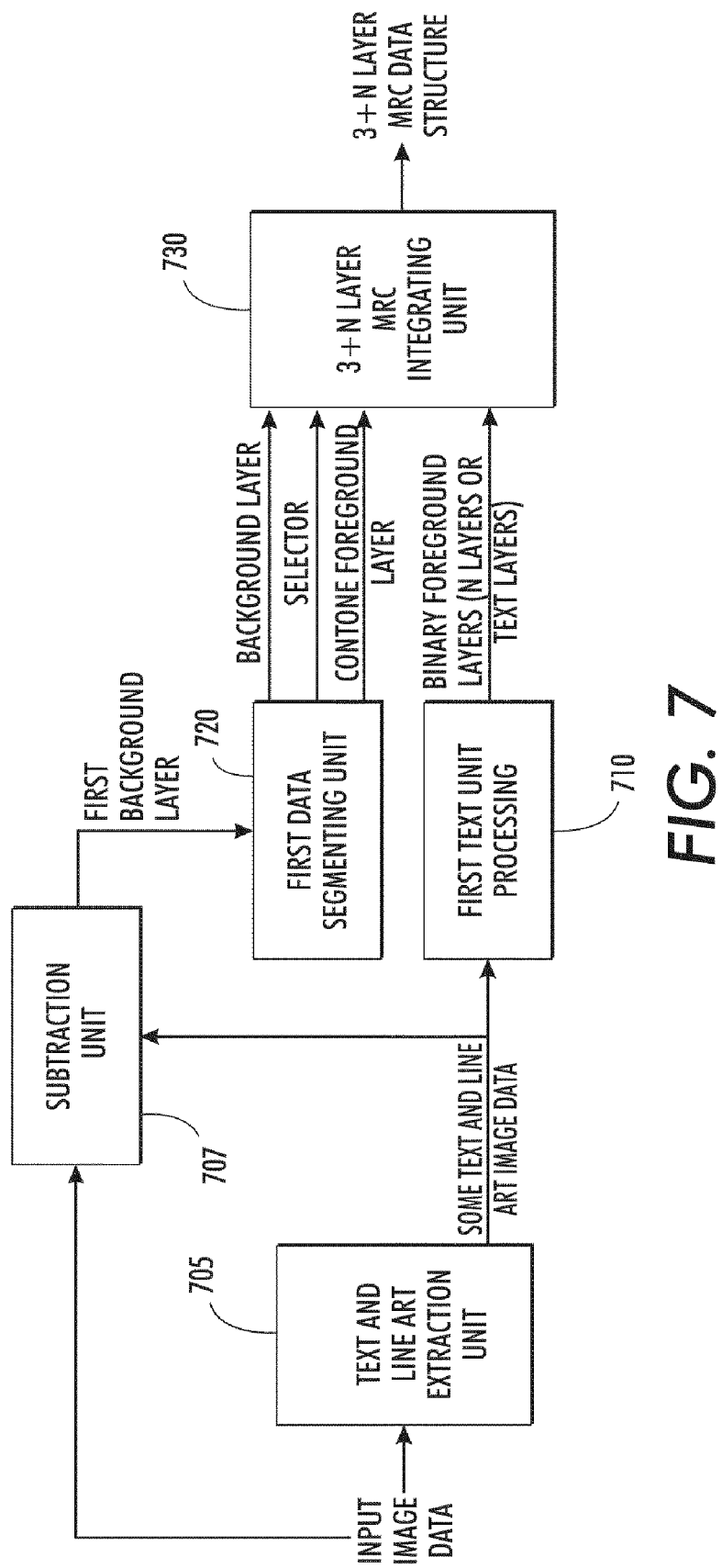
FIG. 7 shows a system for processing image data, wherein the input image data is first separated into pictorial and text regions, an N-layer MRC model is applied to text regions and a three-layer MRC model is applied to pictorial regions according to an embodiment of the present disclosure.

FIG. 7 shows a system for processing image data, wherein the input image data is first separated into pictorial and text regions, an N-layer MRC model is applied to text regions and a three-layer MRC model is applied to pictorial regions according to an embodiment of the present disclosure.

The system 700 for generating a 3+N layer MRC data structure generally includes a text and line art extracting unit 705, a subtraction unit 707, a first text processing unit 710, a first data segmenting unit 720, and a 3+N layer MRC integrating unit 730. In an embodiment, the functionality of the various components of the system 700 may be combined, and/or additional components may be provided.

Input image data may be received by the system 700 through an interface. In one embodiment, the interface may be connected to a network, a memory device, or machine (e.g., a scanner) to receive input image data.

The text and line art extracting unit 705 may be configured to receive input image data and extract some of the text and line art features from the input image data. In an embodiment, some of the text and line art features extracted from the input image data are placed into a text image data (i.e., including the line art and text features). In an embodiment, this extraction is done by using, for example, auto-windowing operation, of any of a number of types known in the art or other morphological operations discussed above. The auto-windowing operation generally is configured to segment the image into discrete sections. The subtraction unit 707 may be configured to subtract the text image data (i.e., from the text and line art extraction unit 705) from the input image data to obtain a first background layer. The first background layer includes the text and line art features not extracted from the input image data and pictorial features of the input image data.

The first text processing unit 710 may be configured to receive the extracted text and line art image data (i.e., including some of the text and line art features from the input image data) from the text and line art extracting unit 705 and to generate one or more binary foreground layers (i.e., N-layers). In an embodiment, the extracted text and line art image data may be separated into one or more binary foreground or N-layers based on the color and spatial proximity of the different text regions. In other words, the extracted text and line art image data having the same color are clustered together and each cluster is assigned an average value which is assigned to all the pixels in that cluster. For example, more than one cluster may have the same color. Each color cluster may have different sizes based on the spatial coordinates of pixels belonging to that particular cluster. The pixels are assigned to clusters based on their neighboring pixel and color information.

In an embodiment, the resolution of the text layers may be enhanced to further improve image quality by a resolution processing unit (not shown).

The first data segmenting unit 720 may be configured to receive the first background layer from the subtraction unit 707 and to generate a second background layer, a selector layer, and a second contone foreground layer. As noted above, the first background layer may generally include text and line art features not extracted from the input image data, and the pictorial features of the input image data. As noted above, in one embodiment, the second background and second foreground layers data may be contone image data, while the selector layer data may be binary. Various image segmentors may be used, for example, as disclosed in U.S. Pat. No. 7,242,802, mentioned above.

The second background layer data that is generated from the first data segmenting unit 720 (i.e., three-layer MRC model) includes only pictorial information. The second contone foreground layer data that is generated from the three-layer MRC model or the first data segmenting unit 720 includes the text-on-tint information as well as the pictorial edge or color information. The extraction of some of the text and the line art features from the input image data (i.e., by the first text processing unit 710) is generally performed on white-colored areas or background areas or text-on highlight areas.

The 3+N layer MRC integrating unit 730 may be configured to integrate the output of the first data segmenting unit 720 and the first text processing unit 710 to produce a 3+N MRC layer data structure. In other words, the one or more first binary foreground layers output by the first text processing unit 710 are integrated with the second background layer, the selector layer, and the second contone foreground layer output by the first data segmenting unit 720 to produce a 3+N MRC layer data structure having a machine-readable information for storage in a memory device.

Figure 8:
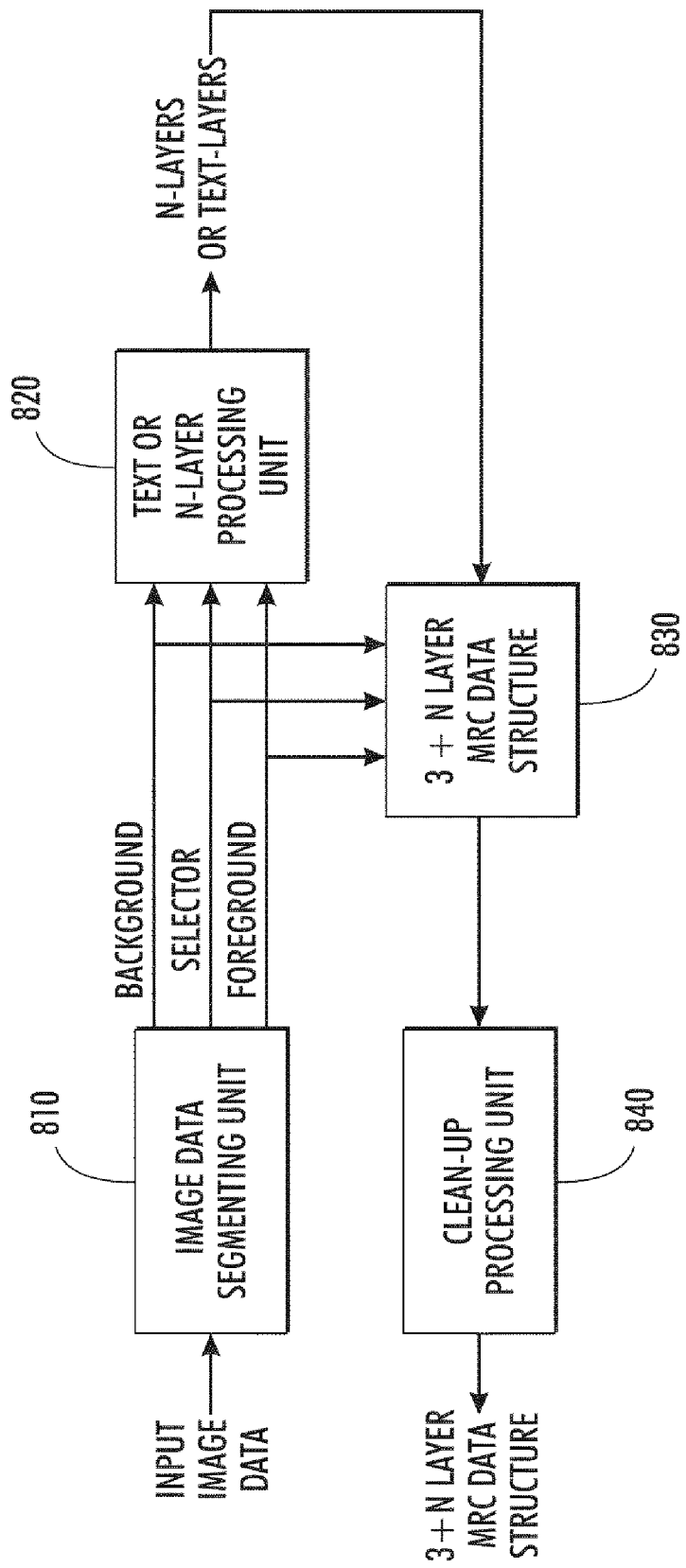
FIG. 8 shows a method for processing image data, wherein a three-layer MRC model is first applied to an input image data and then the selector layer and foreground layer information is used to extract N-layers according to an embodiment of the present disclosure.

FIG. 8 shows a system for processing image data, wherein a three-layer MRC model is first applied to an input image data and then the selector layer and background layer information is used to extract N-layers according to an embodiment of the present disclosure. The system 800 for generating a 3+N layer MRC data structure is generally applied to images that include white background, for example, office documents.

The system 800 for generating a 3+N layer MRC data structure generally includes an image data segmenting unit 810, a text or N-layer processing unit 820, a 3+N layer MRC integrating unit 830, and a clean-up processing unit 840. In an embodiment, the functionality of the various components of the system 800 may be combined, and/or additional components may be provided.

Input image data may be received by the system 800 through an interface. In one embodiment, the interface may be connected to a network, a memory device, or machine (e.g., a scanner) to receive input image data.

The image data segmenting unit 810 may be configured to receive input image data and generate a background layer, a selector layer, and a foreground layer. As noted above, in one embodiment, the background and foreground layers may be contone image data, while the selector layer may be binary. Various image segmentors may be used, for example, as disclosed in U.S. Pat. No. 7,242,802, mentioned above.

The pictorial input image data generally is configured to hold the text-on-tint information. The foreground layer data that is generated from the three-layer MRC model or the non-text image data segmenting unit includes the text-on-tint information as well as the pictorial edge or color information.

The text layer processing unit 820 may be configured to extract one or more binary sub-foreground layers (i.e., N-layers) by analyzing the selector layer and the foreground layer obtained from the image data segmenting unit 810. Each binary sub-foreground layer comprises a pixel data that represents text pixels of a particular color in the input image data. This extraction is preferably is performed on a pixel-by-pixel basis, wherever, the pixel (i.e., used in rendering the image) on the selector layer is ON or includes a value of 1 (i.e., the pixel on the foreground layer includes a non-zero value), and the pixel on background layer includes a value equal to zero or a background value. As noted above, the selector layer may be binary, in which an active (ON) pixel (i.e., the pixel used in rendering the image) value may be 1. The background layer may be contone, in which an active (ON) pixel (i.e., the pixel used in rendering the image) may be some actual color value.

In an embodiment, the text layer processing unit 820 may be configured to extract one or more binary sub-foreground layers based on the color of the pixels and the spatial proximity of the different pixels having same color. In other words, the text areas having the same color are clustered together and each cluster is assigned an average value which is assigned to all the pixels in that cluster. For example, more than one cluster may have the same color. Each color cluster may have different sizes based on the spatial coordinates of pixels belonging to that particular cluster. The pixels are assigned to clusters based on their neighboring pixel and color information. In an embodiment, the resolution of the text layers may be enhanced to further improve image quality by a resolution processing unit (not shown).

The 3+N layer MRC integrating unit 830 may be configured to integrate the output of the image data segmenting unit 810 and the text layers generated by the text layer processing unit 820 to produce a 3+N MRC layer data structure. In other words, the one or more binary sub-foreground layers output by the text layer processing unit 820 are integrated with the background layer, the selector layer, and the foreground layer output by the image data segmenting unit 810 to produce a 3+N MRC layer data structure having a machine-readable information for storage in a memory device.

The clean-up processing unit 840 may be configured to alter or "clean-up" one or more layers of the 3+N MRC layer data structure based on the text layers. For example, in an embodiment, the clean-up processing unit 840 may be configured to "clean-up" the original foreground layer or the selector layer.

In an embodiment, the integrating unit and/or the clean-up processing unit, discussed above (i.e., in relation to the systems 600, 700 and 800) may also be configured to alter the resolution of, and/or compress one or more layers of the resultant data structure to be different from that of the input image data. In an embodiment, the output of the systems 600, 700 and 800 may be connected to a memory device, network, other devices, or combinations thereof.

The systems 600, 700 and 800 disclosed herein may include dedicated hardware like ASICs or FPGAs, software (firmware), or a combination of dedicated hardware and software. For the different applications of the embodiments disclosed herein, the programming and/or configuration may vary. The system may, in some embodiments be incorporated, for example, into a dynamic threshold module of a scanner. In addition, the systems and methods for creating and/or processing the 3+N layer MRC data structure may be software, for example, applications having computer or machine-executable information, created using any number of programming languages (e.g., Ada, C++, Java, etc.). Of course, it will be appreciated that any number of hardware implementations, programming languages, and operating platforms may be used. As such, the description or recitation of any specific hardware implementation, programming language, and operating platform herein is exemplary only and should not be viewed as limiting. Alternatively, or additionally, the application may be a stand-alone application running on a computer which interfaces with a printing system, for example, through a remote network connection, or via a computer-readable storage media. In one embodiment, the applications may be a "plug-in" application that is incorporated into a third-party software application including, for example, document-processing or image production applications. Other configurations may be also implemented.

In the present disclosure, a data structure having machine-readable information for storage in a memory device that when implemented by a processor render an image is provided. The data structure includes a background layer representing the background attributes of an image; a selector layer for identifying one or more foreground attributes of the image not included in the background layer; a foreground layer representing the foreground attributes of the image; and one or more binary foreground layers, wherein each binary foreground layer comprises one or more pixel clusters representing text pixels of a particular color in the image.

Figure 9:
FIG. 9 shows an image with different features that are extracted into different layers of the 3+N layer MRC model.

FIG. 9 shows an image having different features that are extracted into different layers of 3+N layer MRC model. For example, the features represented with numeral 1 generally refer to text extracted into a foreground layer of the 3+N layer MRC model. The features represented with numeral 2 generally refer to text extracted into one or more binary foreground layers (binary text layer or N-layers) of the 3+N layer MRC model. The features represented with numeral 3 generally refer to features of the image that are extracted into a background layer of the 3+N layer MRC model.

Figures 10A, 10B:
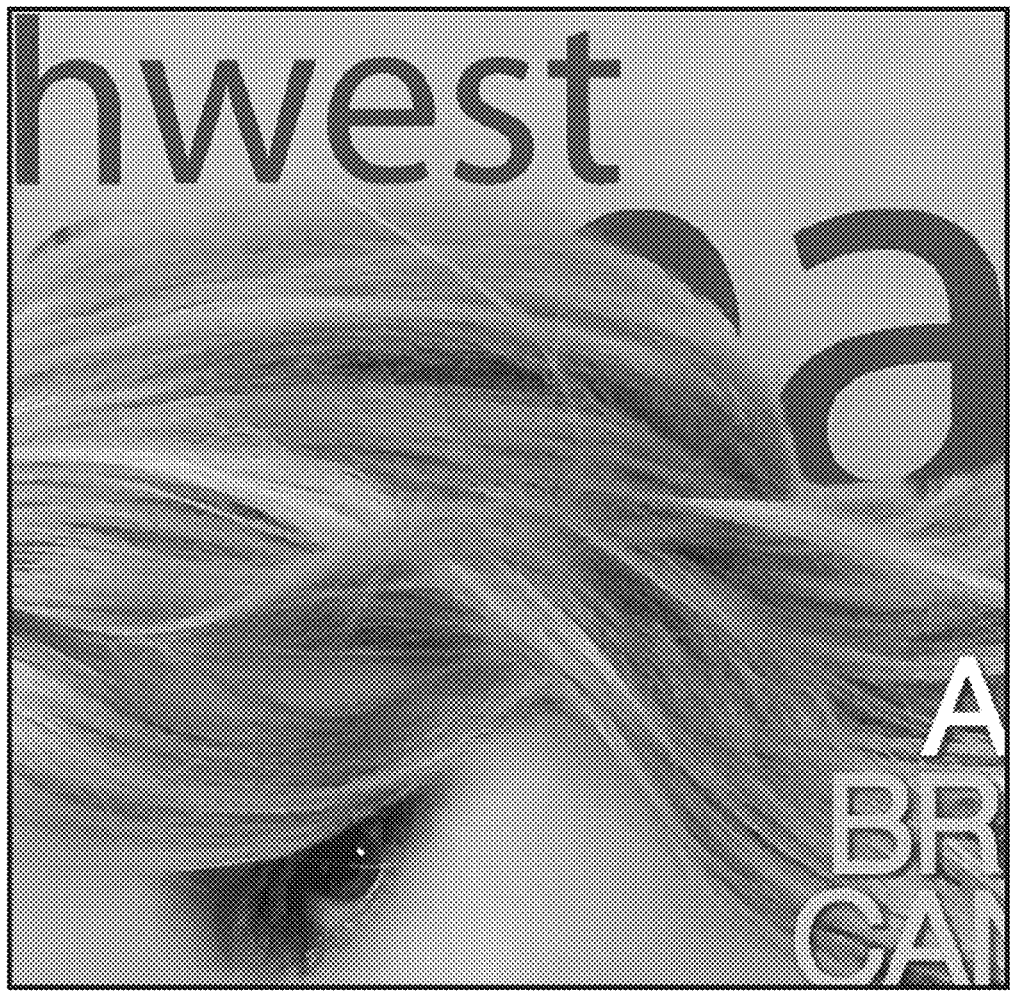
FIGS. 10A-10E shows different layers of the 3+N layer MRC model.
Figure 10C:
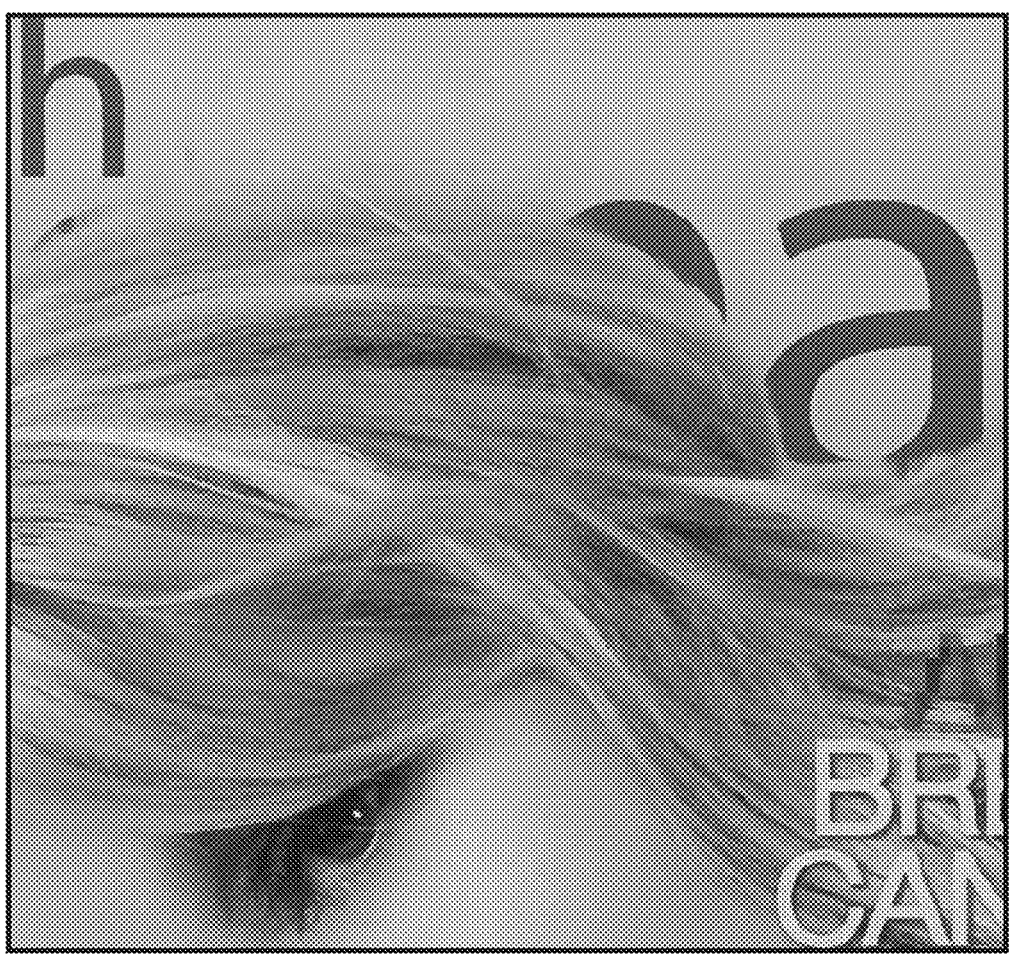
Figure 10D:
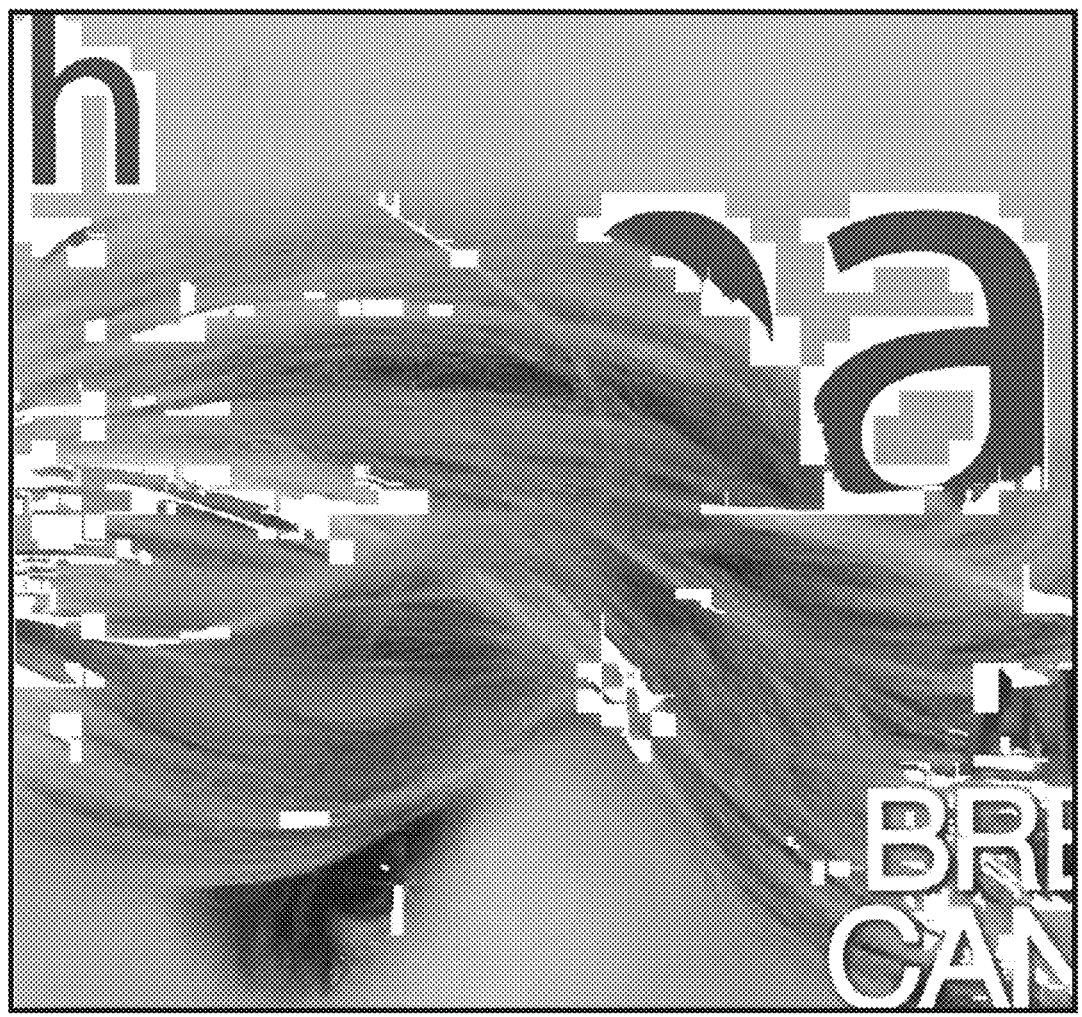
Figure 10E:
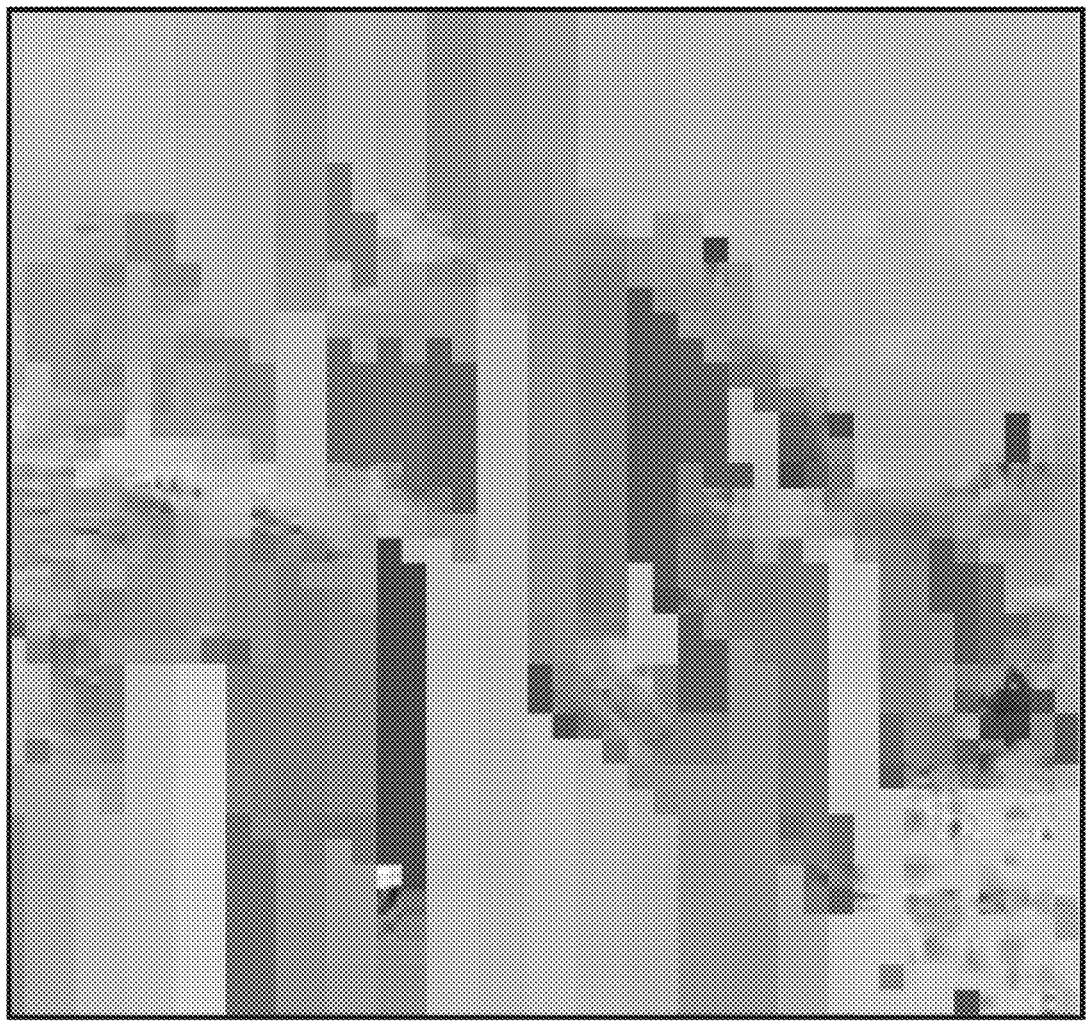

FIG. 10A shows an image showing an N-layer MRC model, FIG. 10B shows an image showing N binary foreground layers (only one layer is shown in the illustrated embodiment shown in FIG. 10B); FIG. 10C shows an image showing background layer obtained from an N-layer MRC model (i.e., this background layer will be further segmented with a three layer MRC model), FIG. 10D shows an image showing a foreground layer generated from a three-layer MRC model, and FIG. 10E shows an image showing background layer from a three-layer MRC model (i.e., a three-layer MRC model applied to the image shown in FIG. 10C). The N binary foreground layers of FIG. 10B, the foreground layer of FIG. 10D, the background layer of FIG. 10E are integrated into a data structure having machine-readable information for storage in a memory device that when implemented by a processor renders an image.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for processing image data, comprising:
using at least one processor to perform the following:
providing input image data;
extracting at least text and line art features from the input image data into a text image data;
subtracting the text image data from the input image data to obtain a first background layer, the first background layer comprising text and line art features not extracted from the input image data and pictorial features of the input image data;
processing the text image data to generate:
one or more first binary foreground layers, wherein each first binary foreground layer comprises one or more pixel clusters representing text and line art pixels of a particular color in the text image data;
segmenting the first background layer to generate:
a second background layer representing the background attributes of the first background layer;
a second contone foreground layer representing the foreground attributes of the first background layer; and
a selector layer for identifying one or more foreground attributes of the second contone foreground layer not included in the second background layer; and
integrating the second background layer, the selector layer, the second contone foreground layer, and the one or more first binary foreground layers into a data structure having machine-readable information for storage in a memory device.

2. The method according to claim 1, wherein the second contone foreground layer comprises text-on-tint information, pictorial color information, and pictorial edge information.

3. The method according to claim 1, wherein the second background layer comprises pictorial and background information.

4. The method according to claim 1, wherein segmenting the text image data to generate one or more first binary foreground layers is based on the color and spatial proximity of different text and line art features.

5. The method according to claim 1, wherein extracting at least text and line art features from the input image data is performed on white-colored areas or background areas.

6. A data structure having machine-readable information for storage in a memory device that when implemented by a processor render an image, the data structure comprising:
one or more binary foreground layers, wherein each binary foreground layer comprises one or more pixel clusters representing text and line art pixels of a particular color in an image;
a contone foreground layer representing the foreground attributes of a first background layer of the image, wherein the first background layer comprises text and line art features of the image not included in the binary foreground layers and pictorial features of the image;
a second background layer representing the background attributes of the first background layer; and
a selector layer for identifying one or more foreground attributes of the contone foreground layer not included in the second background layer.

* * * * *